US012623892B1

(12) United States Patent
Stecker, Sr.

(10) Patent No.: US 12,623,892 B1
(45) Date of Patent: May 12, 2026

(54) SAFETY JACK

(71) Applicant: David W. Stecker, Sr., Schaumburg, IL (US)

(72) Inventor: David W. Stecker, Sr., Schaumburg, IL (US)

( * ) Notice: Subject to any disclaimer, the term of this patent is extended or adjusted under 35 U.S.C. 154(b) by 287 days.

(21) Appl. No.: 17/985,877

(22) Filed: Nov. 13, 2022

Related U.S. Application Data

(63) Continuation-in-part of application No. 16/428,747, filed on May 31, 2019, now abandoned.

(60) Provisional application No. 62/679,797, filed on Jun. 2, 2018.

(51) Int. Cl.
*B66F 3/24* (2006.01)
*B66F 3/30* (2006.01)
*B66F 3/36* (2006.01)
*B66F 3/42* (2006.01)

(52) U.S. Cl.
CPC .................. *B66F 3/30* (2013.01); *B66F 3/24* (2013.01); *B66F 3/36* (2013.01); *B66F 3/42* (2013.01)

(58) Field of Classification Search
CPC ...... B66F 3/30; B66F 3/24; B66F 3/42; B66F 3/36; B66F 5/04; B66F 13/00; B66F 3/08; B66F 3/25; B66F 3/26; F15B 15/24
USPC .......................... 254/93 H, 133 R, 134, 93 R
See application file for complete search history.

(56) References Cited

U.S. PATENT DOCUMENTS 2,852,229 A * 9/1958 Gross ........................ B66F 3/24 254/134
3,027,140 A * 3/1962 Holzbach .............. E04G 25/065 248/354.3
3,222,030 A * 12/1965 Thorpe ............. E04F 15/02452 254/133 R
3,796,055 A * 3/1974 Mahony .................. E02D 35/00 405/230
4,087,076 A * 5/1978 Getty ....................... B66F 3/247 92/165 R
5,176,472 A * 1/1993 Kinder .................... E02D 35/00 405/230
5,722,798 A * 3/1998 Gregory ................ E04G 23/065 254/133 R (Continued)

FOREIGN PATENT DOCUMENTS

CN 203144000 U * 8/2013
CN 108193704 A * 6/2018 ............. E02D 29/02

(Continued)

OTHER PUBLICATIONS

Powerbuilt UniJack Combination Hydraulic Bottle Jack and Jackstand (Year: 2024).*
Translation, Dong, et al. KR-200345807-Y1 (Year: 2004).*

*Primary Examiner* — Mahdi H Nejad
(74) *Attorney, Agent, or Firm* — Chicago IP Law; Steven M. Evans

(57) ABSTRACT

The safety jack includes a base and a piston jack mounted on the base. The piston jack includes a base tube mounted on the base. A threaded rod within the base tube has a portion extending above the base tube, where the threaded rod is free to move up and down within the base tube. A nut on the portion of the threaded rod extends above base tube, and a jack saddle is connected to a top of the piston and a top of the threaded base. The nut can be screwed down onto a top of the base tube so as to prevent the jack saddle from being lowered.

18 Claims, 11 Drawing Sheets

(56) References Cited

U.S. PATENT DOCUMENTS

| | | | | | |
|---|---|---|---|---|---|
| 5,800,094 | A * | 9/1998 | Jones | E02D 35/00 254/133 R |
| 5,819,482 | A * | 10/1998 | Belke | E04G 25/06 248/354.3 |
| 6,079,905 | A * | 6/2000 | Ruiz | E02D 27/48 405/230 |
| 7,685,689 | B1 * | 3/2010 | Del Castello | E03C 1/2665 254/133 R |
| 8,132,788 | B2 * | 3/2012 | Realegeno-Amaya | B66F 3/36 254/133 R |
| 8,500,096 | B2 * | 8/2013 | Walton | F16M 11/00 254/8 B |
| 8,887,451 | B2 * | 11/2014 | Gregory | E04G 23/065 52/741.15 |
| 9,676,599 | B1 * | 6/2017 | Baker | B66F 3/25 |
| 10,214,399 | B2 * | 2/2019 | Moore | B66F 3/36 |
| 11,926,985 | B2 * | 3/2024 | Robertson | E02D 35/00 |
| 2003/0160221 | A1 * | 8/2003 | Dunbar, Sr. | B66F 3/30 254/88 |
| 2005/0253121 | A1 * | 11/2005 | Miner | B66F 5/00 254/8 B |
| 2008/0308777 | A1 * | 12/2008 | McCaleb | E04G 23/0218 254/98 |
| 2012/0112147 | A1 * | 5/2012 | Hernandez, Jr. | B66F 3/30 254/93 H |
| 2016/0016767 | A1 * | 1/2016 | Jones | E02D 27/38 414/800 |

FOREIGN PATENT DOCUMENTS

| | | | | |
|---|---|---|---|---|
| CN | 208039300 | U * | 11/2018 | |
| DE | 102005059480 | A1 * | 7/2006 | B66F 3/08 |
| KR | 200345807 | Y1 * | 3/2004 | E01D 22/00 |
| KR | 20050067631 | A * | 7/2005 | E01D 22/00 |
| PH | 22014000443 | U1 * | 10/2014 | |

* cited by examiner

SAFETY JACK

CROSS-REFERENCE TO RELATED APPLICATIONS

This non-provisional patent application is a Continuation-in-Part (CIP) of non-provisional patent application Ser. No. 16/428,747, filed on May 31, 2019, entitled "Safety Jack," which claims priority and benefit of provisional patent application No. 62/679,797, entitled "Combo Safety Jack," filed on Jun. 2, 2018. Both of the above-referenced patent applications in this paragraph are hereby incorporated by reference.

BACKGROUND OF THE INVENTION

Field of the Invention

The present invention relates generally lifting jacks, and more specifically, to various safety mechanisms for lifting jacks.

Description of Related Art

Lifting jacks or jacks for lifting are used for many different tasks. Many of these tasks could result in serious injury should a lifting jack fail. For example, portable jacks, such as bottle jacks, are used for lifting vehicles so that a person can work underneath a vehicle. If a jack holding a vehicle above a person working underneath the vehicle should fail, serious injury or death can occur.

A conventional protective measure to protect an individual working under a vehicle from being injured by a failing jack lifting that vehicle is to use a second jack, such as a jack stand. A jack stand typically uses a pin in a hole to lock the jack in position, thus making lifting failure far less likely than with a hydraulic jack, pneumatic jack, or even a mechanical jack.

Relying on a jack stand as a protective measure has several disadvantages. First, having to carry or use a second safety jack for each primary jack is burdensome. Additionally, setting a jack stand to be the same height as the primary jack can be difficult, as jack stands typically have predetermine pin height levels, which may not be the same as the desired lift height. Jack stands also are generally not designed to raise an object, and thus, the item being lifted typically must first be raised above the jack stand, and then lowered onto the jack stand by the primary lifting jack. Further, there is the added cost and time of having to purchase, set, store, and transport additional jacks.

Accordingly, there is a need for a primary lifting jack that also provides a simple, easily utilized, and cost effective safety apparatus that safeguards a user from lifting failures of the primary lifting jack.

ASPECTS AND SUMMARY OF THE PRESENT INVENTION

One aspect of the present invention is to provide a lifting jack for heavy objects that includes a safety feature to protect users from serious injury due to failure of the lifting jack;

Another aspect of the present invention is to reduce wear on a lifting jack by providing backup support during lifting operations;

A further aspect of the present invention is to minimize setup time during lifting and repair operations;

An additional aspect of the present invention is to reduce operational costs and improve time efficiency;

Another aspect of the present invention is to simplify operating procedures during lifting operations;

A further aspect of the present invention is to reduce storage and transportation requirements for lifting operations; and An additional object of the present invention is to provide a self-rising safety jack.

In order to achieve these aspects and others, the present invention provides a lifting jack including a safety apparatus should the lifting jack fail. The present invention, referred to by the inventor as the "Safety Jack," solves the problem of hydraulic, pneumatic, or mechanical jacks unintentionally lowering or having catastrophic failures, resulting from failures of seals in hydraulic or pneumatic jacks, and failure of gears in mechanical jacks.

In order to achieve these aspects and others, a first embodiment of the present invention provides a base and a piston jack mounted on the base. The bottle or piston jack includes a piston within an inner tube, and a base tube having a top and a bottom and an inner surface. A threaded rod is located within the base tube, wherein a portion of the threaded rod extends above the top of the base tube, and movement of the threaded rod within the base tube is unrestricted by a smooth inner surface of the base tube that comes in contact with or adjacent to the outer surface of the threaded rod. A threaded stop nut is located on the portion of the threaded rod extending above the top of the base tube. A jack saddle is secured to both a top of the piston and a top of the threaded rod, wherein raising the piston of the piston jack causes the jack saddle to raise the threaded rod. After the threaded rod is raised by the piston, the threaded stop nut can be screwed down onto the top of the base tube so as to prevent the piston of the piston jack from being lowered after the piston is raised.

The threaded rod with the adjustable support nut, connected to the piston of the piston jack by the jack saddle, raise together simultaneously to achieve a safety aspect of the present invention. As the jack piston is raised, the piston pulls up the threaded rod connected to the jack saddle, and then the nut on the threaded rod is then screwed down into the top of the base tube, and thereby becoming a solid support so the piston on the jack side can no longer be accidentally lowered. If multiple threaded rods in base tubes are provided on opposing sides of the piston jack, the hydraulic or pneumatic pressure of the jack can be released, thus stopping fatigue on seals within the jack. If desired, the nut on the threaded rod also can be used to raise and lower a lifted object should the piston jack fail. Accordingly, the nut on the threaded rod, when located on the top of the base tube, can be used as a screw jack to raise and lower the jack saddle should the piston jack fail.

The present invention provides numerous advantages. One advantage of the threaded rod, nut and base tube combination is that the nut allows for adjustment, either up or down, while always providing a solid support for a load being lifted and supported. The nut and base tube provide protection if seals of a pneumatic or a hydraulic jack or even a mechanical jack fails, which is why merchants sometimes include notice with piston jacks reminding purchasers of piston jacks also to buy a separate stand alone jack stand. A disadvantage of separate jack stands being used as protection against a piston jack failure is when the jack stand is providing the lift support, then the object being supported must first be lifted up above the jack stand in order to remove the jack stand. This operation provides a significant opportunity for a serious accident to occur. The advantage of incorporating the base tube, threaded rod and nut as a backup for piston jack failure is that the object being lifted can be lifted very quickly with the piston jack, while still being supported by the solid support of the threaded rod. As the object is lifted into position by the piston jack, the threaded rod connected to the jack saddle is pulled upward and the nut then is screwed down against the top of the base tube. This provides a solid support should the piston jack fail. The nut can be screwed up or down for any height adjustment. For example, if a beam needs to be raised into position under a home once it is in the desired position, the nut can be secured down and the hydraulics or pneumatics released, and the piston jack left in place to hold up the beam and used for future adjustment, should settling occur. The inner wall of the base tube preferably is smooth and does not restrict movement of the threaded rod within the base tube as the outer surface of the threaded rod slides against or adjacent to the inner wall of the base tube as the threaded rod moves up or down within the base tube. The threaded rod, while not required, preferably is at least as longitudinally long as the longitudinal length of the base tube.

In accordance with another embodiment of the present invention, a piston jack is provided having a base, a top surface, and an inner tube with a unitary piston having at least a portion within the inner tube. An upper portion of the piston has a threaded surface and a lower portion of the piston has a smooth surface, wherein movement of the threaded surface of the unitary piston within the inner tube is unrestricted by and can slide adjacent to and against a smooth inner surface of the inner tube of the piston jack. An O-ring gasket is located around the smooth surface on the lower portion of the piston so as to provide a hermetic or airtight seal between the smooth surface on the lower portion of the piston and the inner tube of the piston jack. A threaded stop nut is located on the threaded surface of the upper portion of the piston above the top surface of the piston jack, wherein screwing the threaded stop nut down so as to contact the top surface of the piston jack prevents the piston from being lowered after being raised.

In accordance with the second embodiment of the present invention, the nut allows for adjustment, either up or down, while always providing a solid support for a load being lifted and supported by the piston jack. The nut provides protection if seals of a pneumatic or a hydraulic jack fail, or a mechanical jack fails.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

DETAILED DESCRIPTION OF THE PREFERRED EMBODIMENTS

Figure 1:
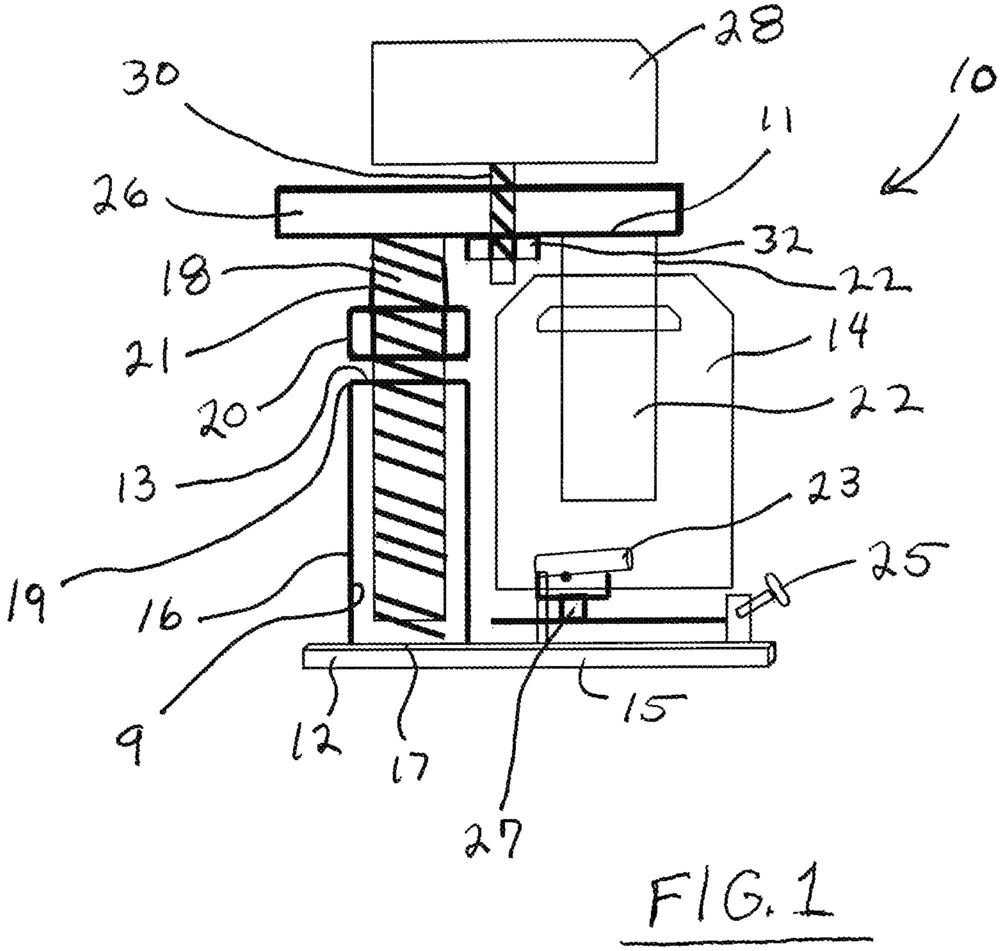
FIG. 1 is a cross-sectional side view of a jack configured in accordance with a first embodiment of the present invention.

Referring now to the drawings, FIG. 1 is a cross-sectional side view of a safety jack 10 configured in accordance with a first embodiment of the present invention. The safety jack 10 includes a base 12. A bottom 15 of a piston jack 14 is secured to the base 12, preferably constructed of metal. A bottom 17 of a base tube 16 preferably is secured to the base 12 of the safety jack 10. The base tube 16 preferably is constructed of metal with a smooth inner wall and the bottom 17 is secured to the base 12. The bottle jack or piston jack 14 and the base tube 16 are mounted adjacent to each other on the base 12. The base tube 16 includes a metal threaded rod 18 inside the base tube 16. The threaded rod 18 fits loosely within the base tube 16, and preferably is longer than the base tube 16 so as to extend above and beyond the opening 13 on the top 19 of the base tube 16. The outer surface of the threaded rod 18 slides adjacent to and/or against the smooth inner wall 9 of the base tube 16, wherein the smooth inner wall 9 minimizes friction or resistance to the threaded rod 18 sliding within the base tube 16. A metal stop nut 20 is included on the upper portion 21 of the threaded rod 18 extending above and beyond the top 13 of the base tube 16. The base 12 and the base tube 16 are preferably constructed of metal, such as steel. The piston jack or bottle jack 14 includes a piston 22. The piston jack 14 includes a socket 23 connected to the piston assembly 27. The socket 23 is configured to receive a handle to crank and lift the piston 22 of the piston jack 14. The piston jack 14 preferably is a hydraulic, pneumatic, or mechanical driven jack. A release valve 25 is included for bleeding air or liquid to quickly lower the piston 22 of the piston jack 14. The base tube 16 and piston jack 14 are preferably secured to the base 12 by welding.

In accordance with the present invention, the top of both the threaded rod 18 and the piston 22 are connected to a metal jack saddle 26, preferably by welding. The jack saddle 26 preferably is a rectangular steel bar. A jack head 28 can be secured to the top of the jack saddle 26 preferably by a bolt 30 and nut 32 fed through apertures in the jack saddle 26 and jack head 28. The jack head 28 can be multiple configurations (see FIG. 5).

In accordance with the present invention, the top of the threaded rod 18, which is secured to the top 11 of the piston 22 by the jack saddle 26, is raised as the piston 22 is raised. Once the piston 22 is raised to the desired height or level, the nut 20 on the threaded rod 18 is screwed down to rest against the top 19 of the base tube 16. Once the nut 20 is screwed down on top 19 of the base tube 16, the nut 20 functions as a safety mechanism to prevent the jack saddle 26 from being lowered should seals or other parts within the piston jack 14 fail. Additionally, once the nut 20 is engaged against the top 19 of the base tube 16, pressure supporting the piston 22 of the piston jack 14 can be released or bled to save wear and tear on seals and other internal components of the piston jack 14, thus extending the lifetime use of the piston jack 14. The metal lock nut 20, metal threaded rod 18, and metal base tube 16 can even be used to raise and lower the jack saddle 26 using a wrench on the nut 20 independent of the piston jack 14, should the need arise. While the longitudinal length of the threaded rod 18 is preferably at least as long as the longitudinal length of the base tube 16, the length of the threaded rod 18 can be shorter than the length of the base tube 16. A jack head 28 can be secured to the top of the jack saddle 26 using a nut 32 and bolt 30, or by other techniques.

Figure 2:
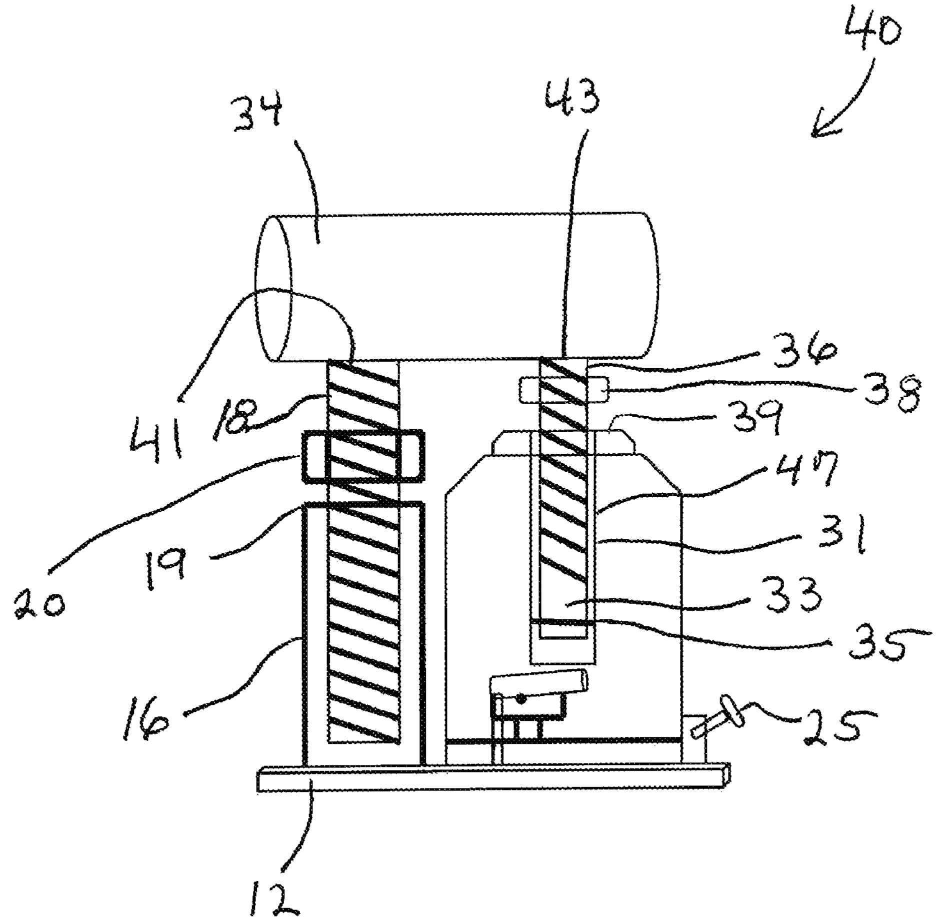
FIG. 2 is a cross-sectional side view of a jack configured in accordance with a second embodiment of the present invention.

FIG. 2 illustrates a safety jack 40 configured in accordance with a second embodiment of the present invention. The safety jack 40 is similar to the safety jack 10 of FIG. 1, except the jack saddle 26 has been removed, and the piston 36 of the piston jack 14 is threaded on the upper portion 29 and includes a nut 38 around the threaded piston 36. The top 41 of the threaded rod 18 and the top 43 of the piston 36 are both connected to the jack head 34, which in this embodiment is a tube. Other configurations for a jack head 34 are possible (see FIG. 5). Similar to the threaded rod 18 and nut 20 of safety jack 10 in FIG. 1, the threaded piston 36 and the nut 38 can be screwed down on top 39 of the body 15 of the piston jack 14 when the jack head 34 is raised to the desired height or level. In this manner, the nut 38 functions as a safety apparatus, similar to the nut 20, to prevent the threaded piston 36 of the piston jack 14 from being lowered should the seals or other mechanisms within the piston jack 14 fail. Furthermore, the nut 38 screwed down on the top 39 of the body 15 of the piston jack 14 can enable the piston jack 14 to be bled via the valve 25 to take pressure off the inner seals of the piston jack 14 while still maintaining the height of the piston 36, and enable the lifespan of the piston jack 14 to be increased. Also, similar to the nut 18, the nut 38 can be used to raise and lower the jack saddle 34 using a wrench or other tool on the nut 38 should the need arise.

The lower portion 33 of the threaded piston 36 preferably is smooth with a grove for an O-ring seal or gasket 35, which is inserted into the inner tube 47 of the piston jack 14 to maintain pneumatic or hydraulic pressure to lift the threaded piston 38. As the threaded piston 36 travels upward and outward, the nut 38 can be turned against the top 39 of the piston jack 14 to create a solid support. The support head 34 also is shown connected directly to the threaded piston jack 36. The inner wall 31 of the inner tube or piston tube 47 preferably is smooth minimizing resistance as the threaded piston 36 moves adjacent to and/or against the inner wall 31 of the piston tube 47.

Figure 3:
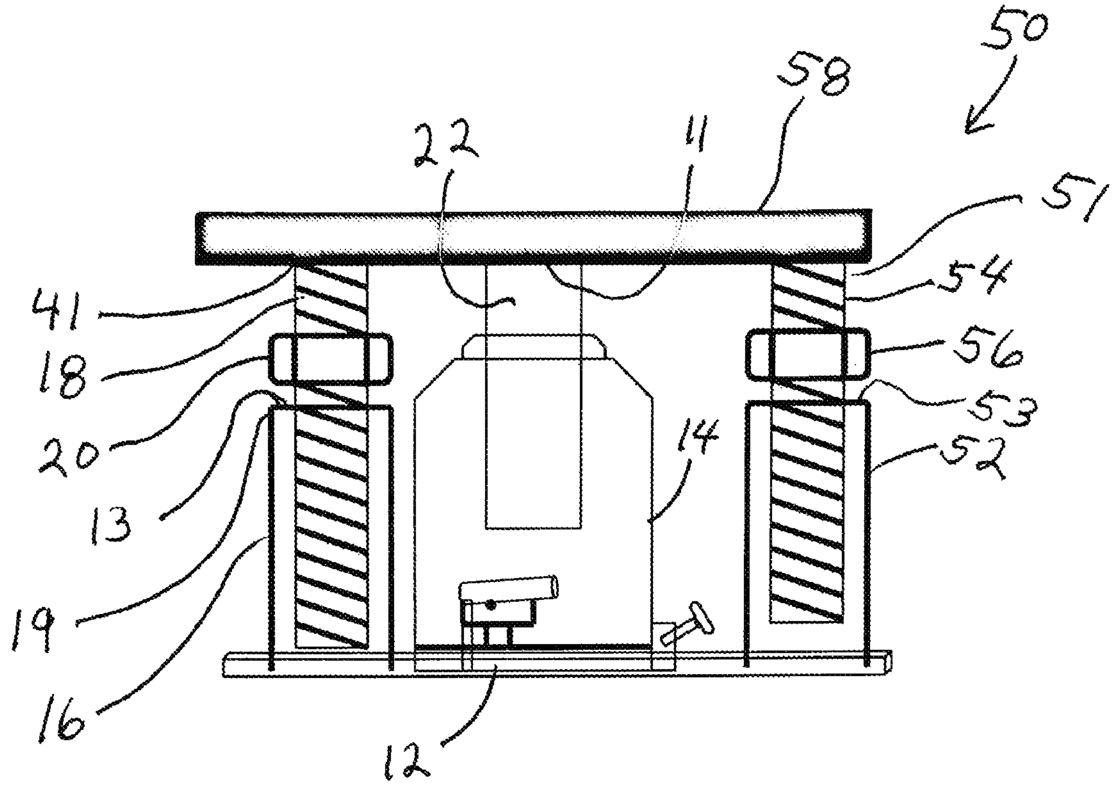
FIG. 3 is a cross-sectional side of a jack configured in accordance with another embodiment of the present invention.

FIG. 3 illustrated a safety jack configuration 50 configured in accordance with a further embodiment of the present invention. The safety jack configuration 50 is similar to the safety jack 10, except a second base tube 52, second threaded rod 54, and second nut 56 that can be screwed down onto the top 53 of the second base tube 52. A jack saddle 58 is connected to the top 41 of the threaded rod 18 and the top 51 of the second threaded rod 54. The jack saddle 58 also is connected to the top 11 of the piston 22 of the piston jack 14. Similar to the safety jack 10 shown in FIG. 1, the safety jack configuration 50 provides two threaded rods 18, 54 with nuts 20, 56 to provide a backup safety apparatus should the piston jack 14 fail. The nuts 20, 56 being screwed down on tops 19, 53 of the base tubes 16, 52 prevent the jack saddle 58 from being lowered should the piston jack 14 fail. The safety jack configuration 50 can be used when additional protection is needed for very heavy lifts. The base tubes 16 and 52 have smooth inner walls to minimize resistance of the outer surface of the threaded rods 18,54 sliding adjacent to and/or against the inner walls of the base tubes 16,52. The base tubes 16, 52 preferably are attached to the base 12.

The jack saddle 58 can be configured to rest, not secured, upon the top 11 of the piston 22 and the tops of the first and second threaded rods 18,54. If the piston 22 is lowered while the jack saddle 58 is supported by the raised first and second threaded rods 18,54, and the first and second stop nuts 20, 56 are on the tops 19, 53 of the first and second base tubes 16,52, the piston jack 14 can be removed and replaced with a repaired piston jack, or the removed piston jack can be used at another location.

Figure 4:
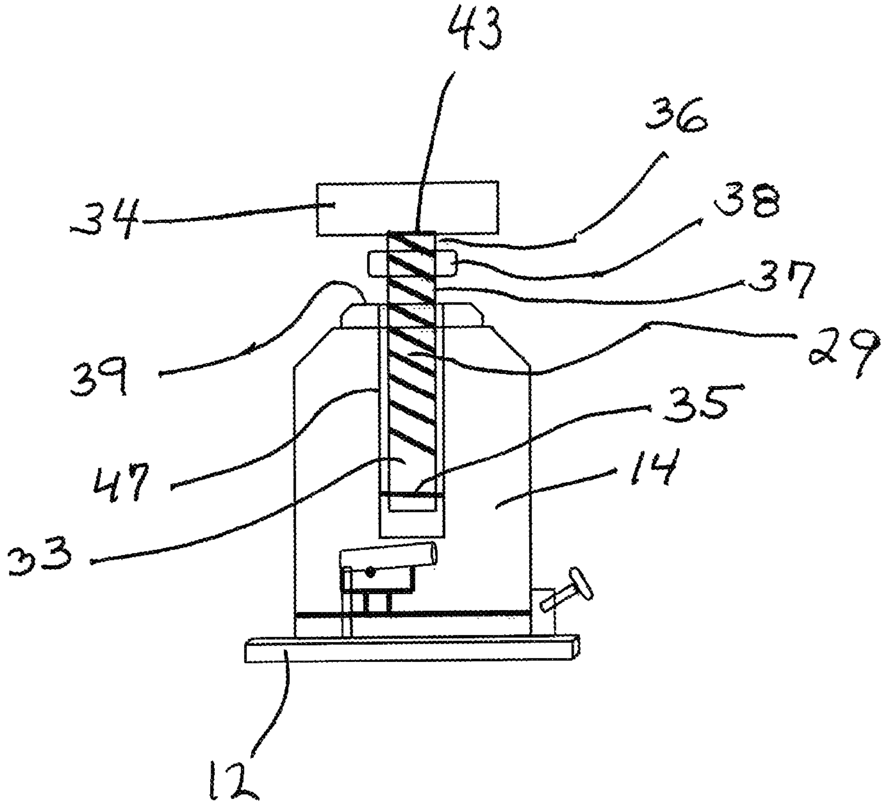
FIG. 4 is a cross-sectional side of a jack configured in accordance with another embodiment of the present invention.

FIG. 4 illustrates the piston jack 14 shown in FIG. 2, wherein the piston 36 of the piston jack 14 is a safety screw piston or a threaded piston 36 having a nut 38 around the portion 37 of the piston 36 extending above and beyond the top 39 of the piston jack 14. This embodiment enables the piston jack 14 with a threaded piston 36 and nut 38 to provide the same safety feature without the additional structure of a base tube 16, as shown in FIGS. 1 and 2. The lower portion 33 of the threaded piston 36 should be smooth with a grove for an O-ring seal 35, which is inserted into the inner tube 47 of the piston jack 14 to maintain pneumatic or hydraulic pressure to lift the threaded piston 36. As the threaded piston 36 travels upward and outward, the nut 38 can be turned against the top 39 of the piston jack 14 to create a solid support. The support head 34 also is shown connected directly to the top 43 of the threaded piston 38.

Figure 5:
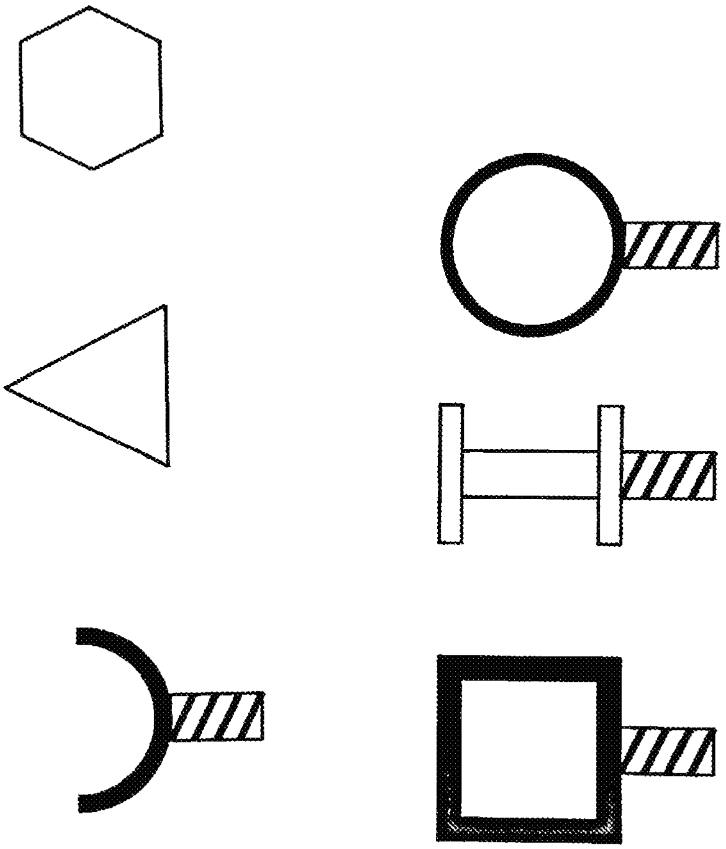
FIG. 5 illustrates end views of several configurations for jack heads configured in accordance with the present invention.

FIG. 5 illustrates cross-sections of multiple jack heads 34, having different configurations for use in the present invention. For example, the jack head 28 shown in FIG. 1 can have a U or square cross-section. The jack head 34 shown in FIG. 2 has a circular cross-section.

Figure 6:
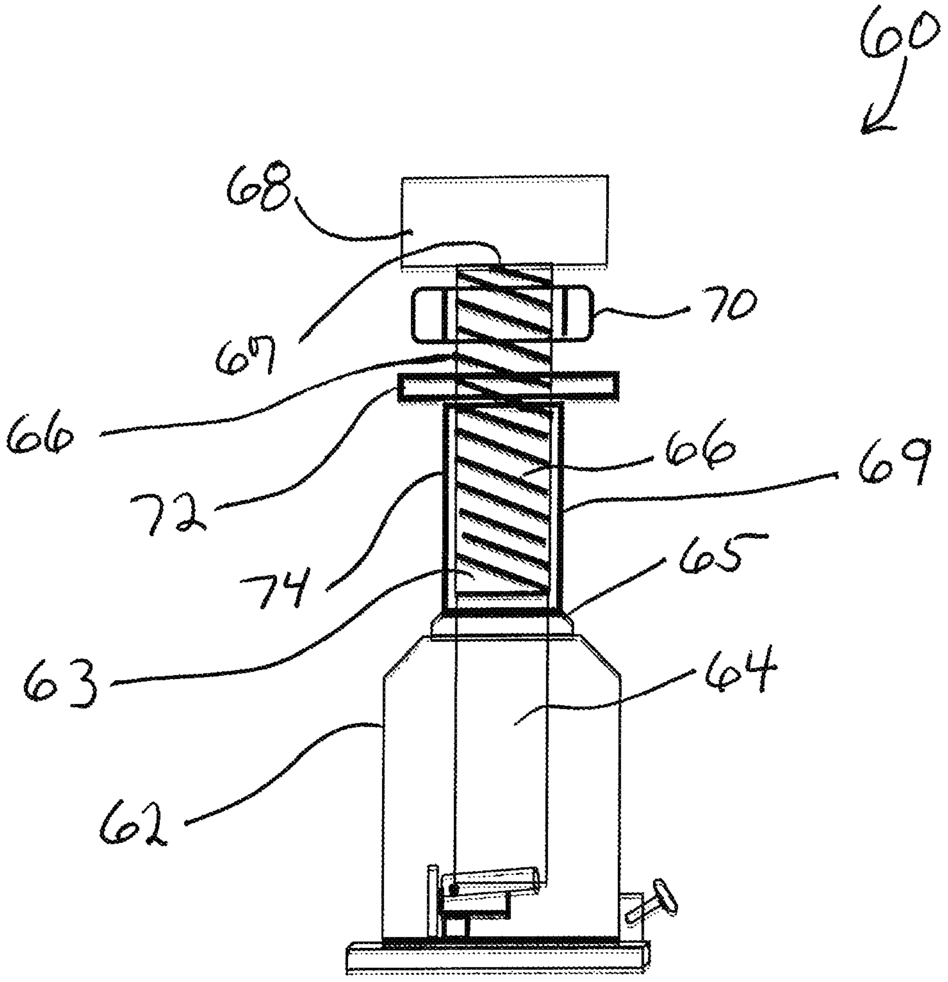
FIG. 6 is a cross-sectional side view of a jack configured in accordance with a further embodiment of the present invention.

FIG. 6 illustrates a cross-sectional side view of a safety jack 60 configured in accordance with a further embodiment of the present invention. The safety jack 60 includes a bottle or piston jack 62 including piston 64. The bottom of the threaded rod 66 is secured to the top 63 of the piston 64, preferably by welding. A jack saddle 68 is secured to the top 67 of the threaded rod 66. A lock or stop screw nut 70 is located on the threaded rod 66 below the jack saddle or jack head 68. In accordance with this embodiment of the present invention, a support tube 74 is located around the threaded rod 66 and on top 65 of the piston jack 62. The support tube 74 has a smooth inner surface 69, so that the outer surface of the threaded rod 66 can easily slide adjacent to and/or against the inner wall 69 of the threaded rod 66. The bottom of the support tube 74 preferably is secured to the top 65 of the piston jack 62 by welding. The support tube 74 sets a minimum height for the jack saddle or jack head 68. The support tube 74 also can provide additional stability for the threaded rod 66.

A metal washer 72 can be included and located between the bottom of the stop nut 70 and the top of the support tube 74. The washer 72 can be secured to the top of the support tube 74 by welding, but the washer 72 preferably rest on the top of the support tube 74. The washer 72 provides additional surface area for the stop nut 70 when the stop nut 70 is screwed down on top of the support tube 74 to prevent the threaded rod 66 on the piston 64 from going down, as a safety feature, after the piston 64 has been raised to a desired height should the piston jack 62 fail. The support tube 74 functions to provide a minimum height for the threaded rod 66, if desired, to which the stop nut 74, jack saddle 68, and threaded rod 66 cannot go below. The support tube 74 can be removed to enable the piston 64 and threaded rod 66 to go to a lower height, if desired, and the support tube 74 is just resting on, and not secured to, the top of the piston jack 62. Similarly, if the support tube 74 is not secured to the top of the piston jack 62, the support tube 74 can even be replaced with a longer or a shorter support tube 74, if desired. Additionally, the stop nut 70 can be used to raise and lower the piston 62 if desired.

Figure 7:
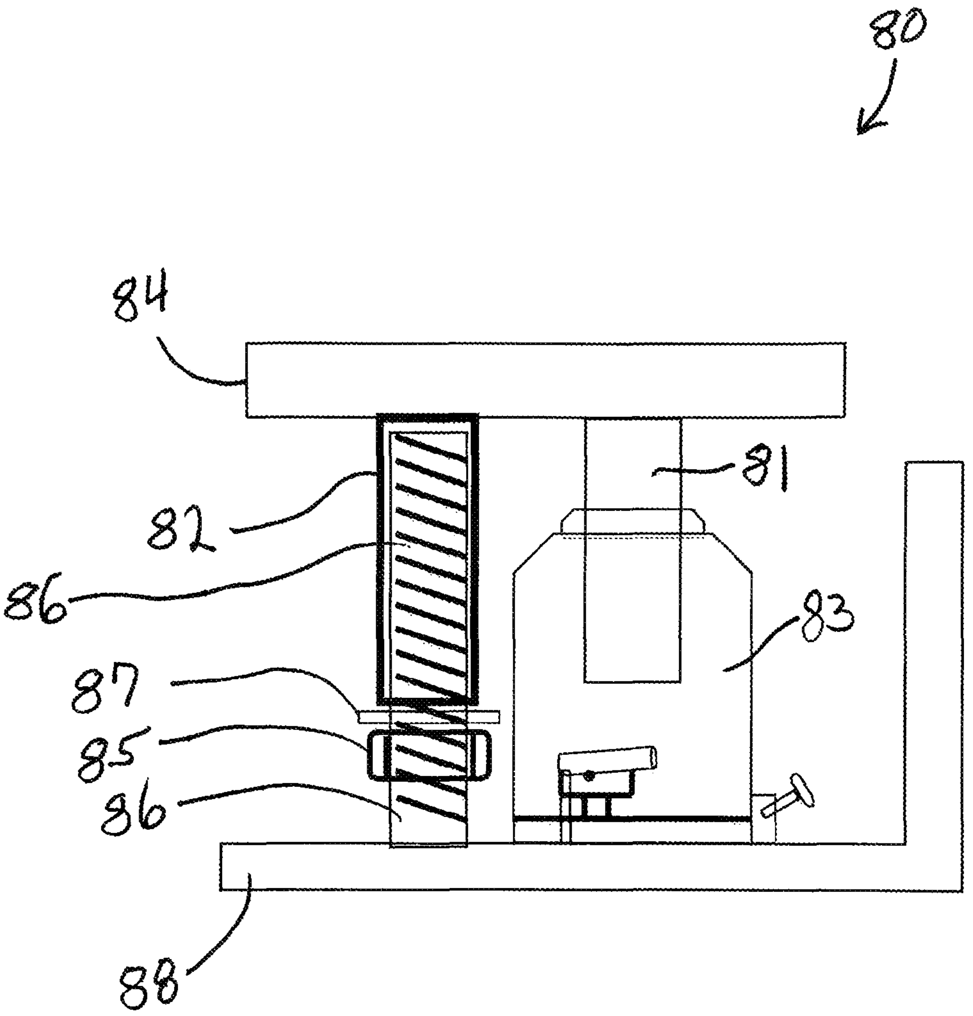
FIG. 7 is a cross-sectional side view of a jack configured in accordance with a further embodiment of the present invention.

FIG. 7 illustrates a safety jack 80 configured in accordance with a further embodiment of the present invention. The safety jack 80 is similar to safety jack 10 of FIG. 1, except the top of the support tube 82 is secured to the bottom of the jack saddle 84. The bottom of the threaded rod 86 is secured to the top of the base 88. The jack saddle 84 also is secured to the top of the piston 81 of the piston jack 83. As the jack saddle 84 is raised by the piston 81, the support tube 82 is raised. The stop nut 85 can then be screwed up to the bottom of the support tube 82 to keep the jack saddle 84 from lowering should the piston jack 83 fail. A washer 87 can be included on the threaded rod 86 between the stop nut 85 and the support tube 82 to provide more surface area for the stop nut 85 when screwing the stop nut 85 up to the bottom of the support tube 82. Similar to base tube 16 and threaded rod 18 of the safety jack 10 in FIG. 1, the threads on the outer surface of the threaded rod 86 freely slide adjacent to and/or against the smooth inner wall of the support tube 82 resulting in minimal resistance. The washer 87 also passes freely over the threaded rod 86. The stop nut 85 can be used to raise and lower the saddle jack 84, if desired, such as when the piston jack 83 fails.

Figure 8:
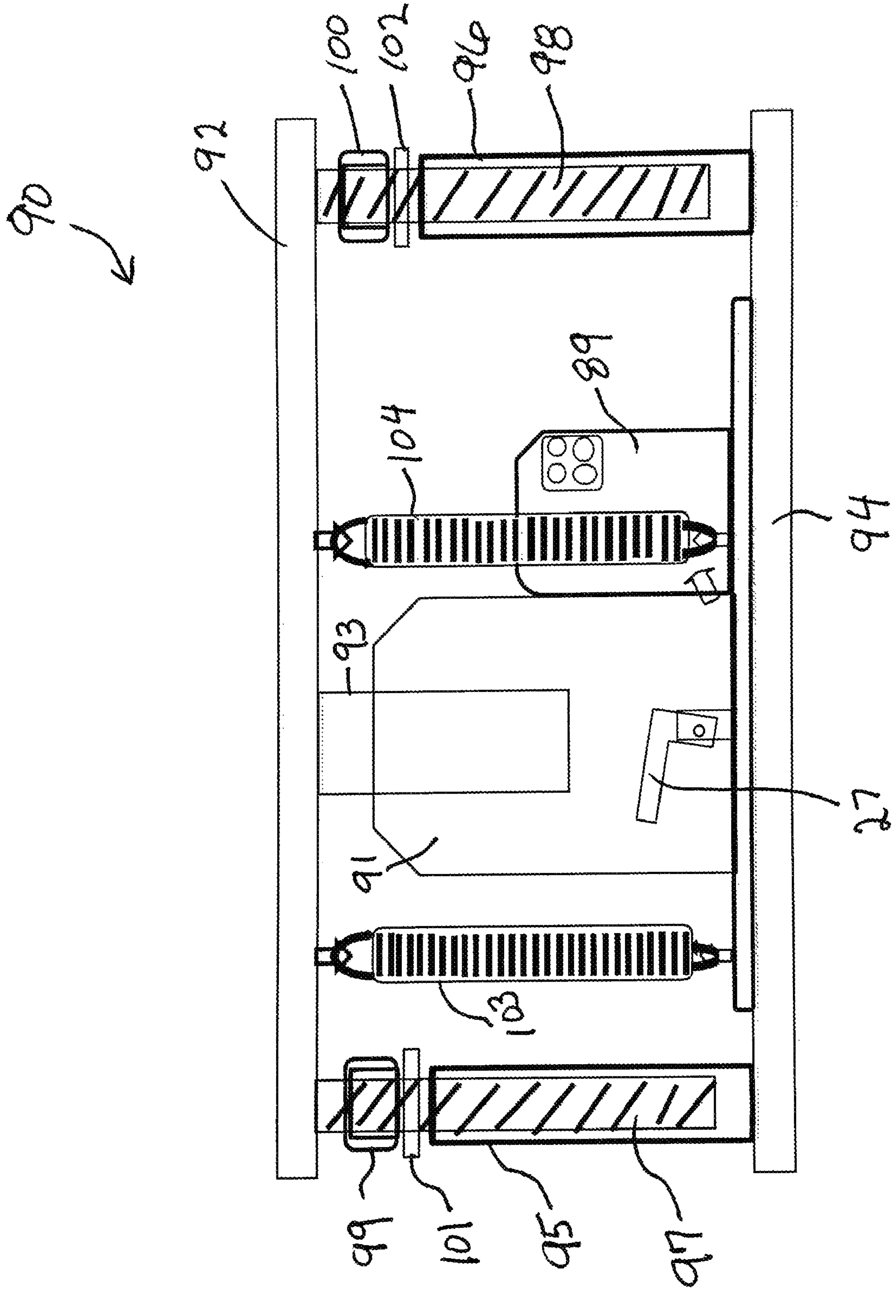
FIG. 8 is a cross-sectional side view of a jack configured in accordance with a further embodiment of the present invention.
Figure 9:
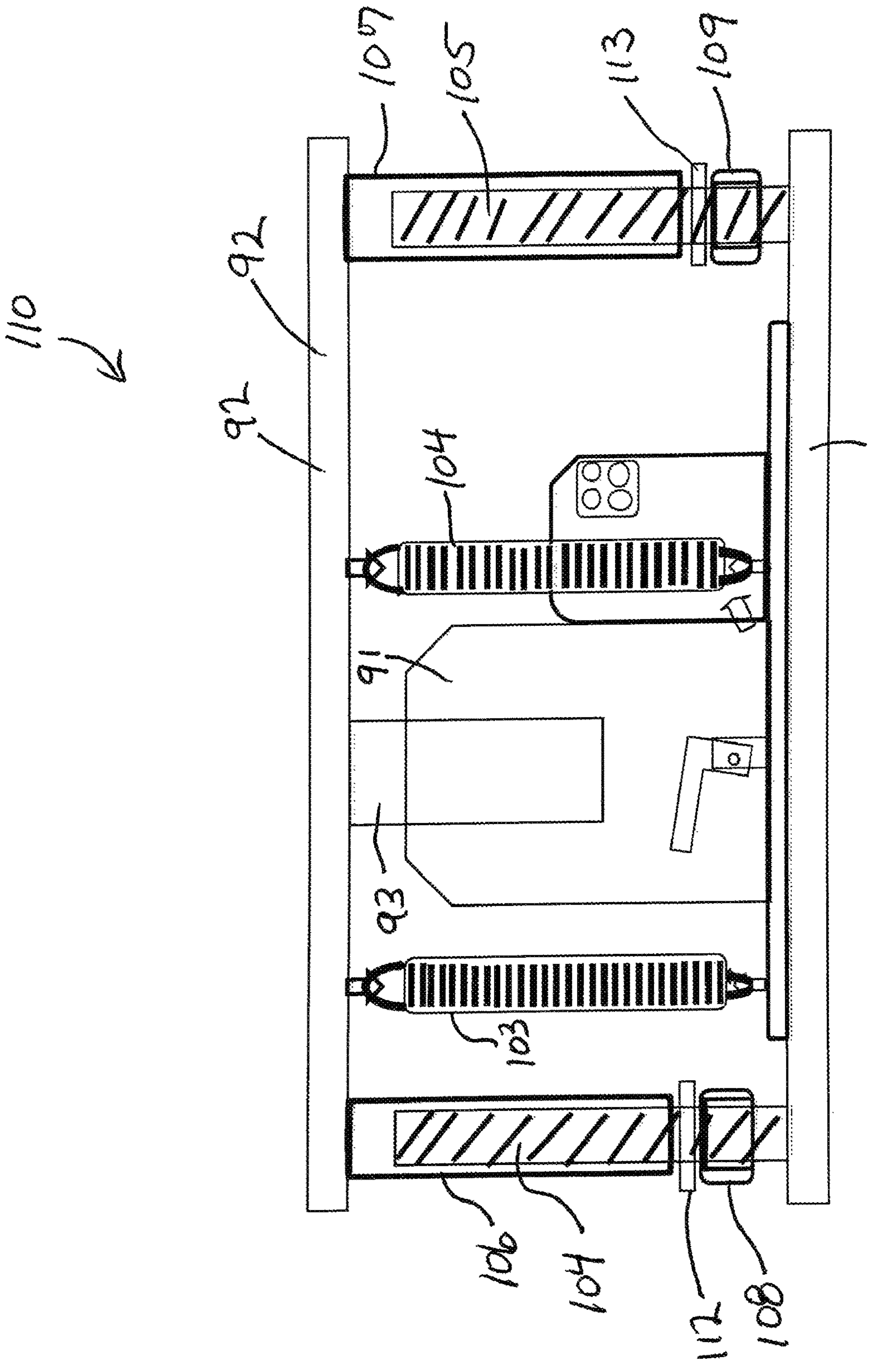
FIG. 9 is a cross-sectional side view of a jack configured in accordance with a further embodiment of the present invention.

FIG. 8 illustrates a safety jack 90 configured in accordance with another embodiment of the present invention. The safety jack 90 includes a planar jack saddle 92 and a base 94. A piston jack 91 is included having a piston 93. The bottom of the piston jack 91 is connected to the base 94, and the top of the piston 93 is connected to the bottom of the jack saddle 92. Support tubes 95 and 96 are located on opposing sides of the piston jack 91. The bottoms of the support tubes 95.96 rods preferably are connected to the base 94. Similarly to the safety jack 50 in FIG. 3, the tops of threaded rods 97 and 98 are connected to the bottom of the jack saddle 92. The threaded rods 97,98 slide freely within the bases tubes 95,96, wherein the smooth inner walls of the support tubes provide minimal resistance against and/or adjacent to the outer surface of the threaded rods 97,98. Stop nuts 99,100, located on the threaded rods 97,98, respectively, can be screwed down on the top of the support tubes 95,96 to prevent the saddle jack 92 from falling should the jack 91 fail. Washers 101,102 are located on and pass freely over the threaded rods 97,98. The washers 101,102 add additional surface area to the top of the support tubes 95,96 for the stop nuts 99,100 to screw down on the top of the support tubes 95,96. The washers 101,102 are located between the support tubes 95,96 and the stop nuts 99,100, respectively. Expansion or extension springs 103 and 104 are located on opposing sides of the jack 91. The top ends of the extension springs 103,104 are connected to the saddle jack 92, and the bottom ends of the extension springs 103,104 are connected to the base 94. The extension springs 103, 104 provide a contraction force to provide a constant force drawing the jack saddle 92 down, so the piston 93 can be more easily lowered. A pneumatic pump 89 connected to the piston jack 91 and socket assembly 27 also are illustrated FIG. 9 illustrates a safety jack 110 configured in accordance with another embodiment of the present invention. The safety jack 110 is similar to the safety jack 90 in FIG. 8, except bottoms of the threaded rods 104 and 105 are secured to the top of the base 94, and the tops of the support tubes 106 and 107 are secured to the bottom of the jack saddle 92. Locks nuts 108 and 109 are located on the threaded rods 104 and 105, respectively, between the bottom of the support tubes 106, 107 and the base 94. Similarly, washers 112 and 113 are located around the threaded rods 104, 105, respectively, between the stop nuts 108, 109, and the support tubes 106, 107, respectively. The lock nuts 108,109 can be screwed up on the bottom of the support tubes 106,107 to keep the saddle jack 92 from falling if the jack 91 fails. The bottom of the jack 91 preferably is secured to the base 94.

Figure 10:
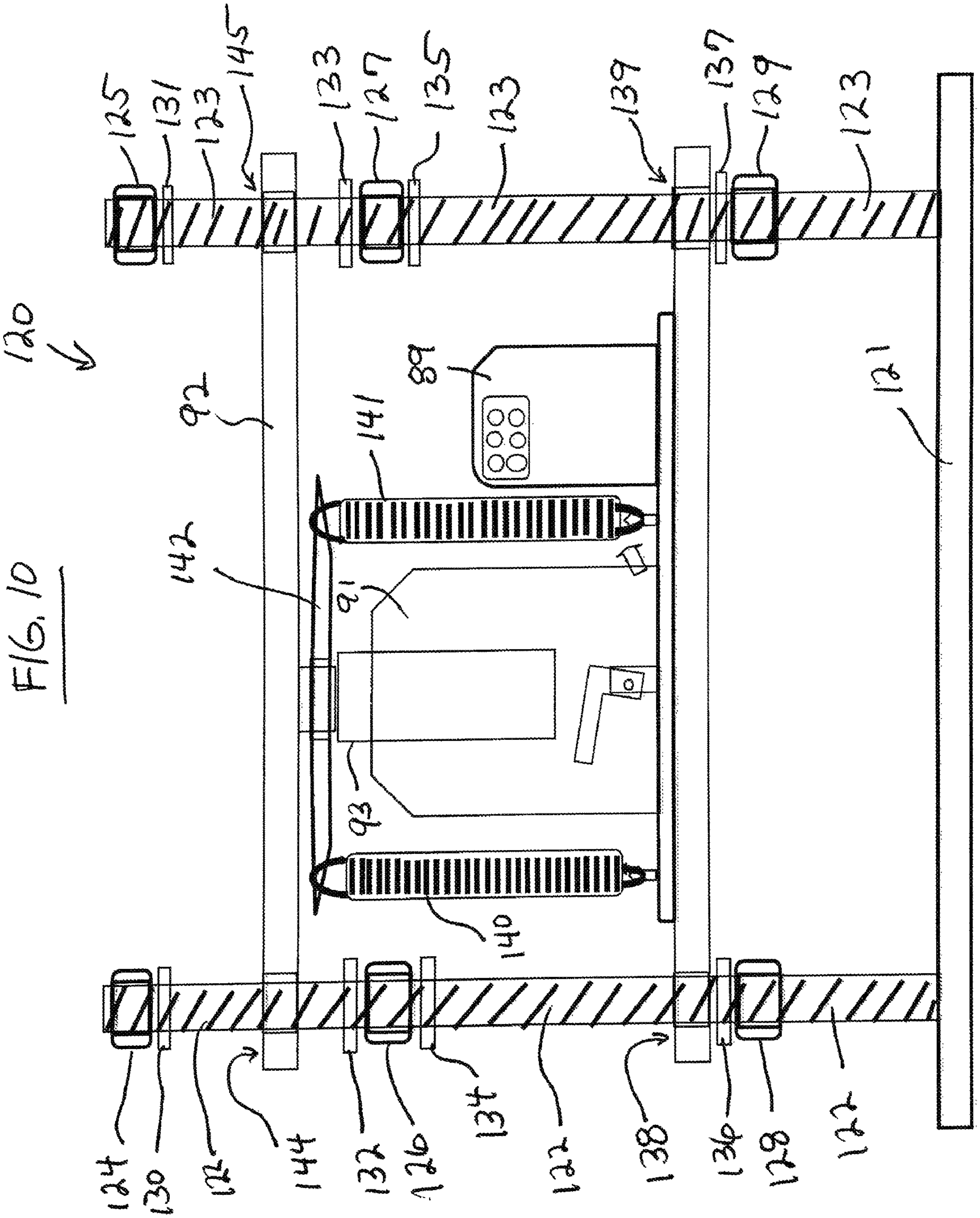
FIG. 10 is a cross-sectional side view of an adjustable height jack configured in accordance with a the present invention.

FIG. 10 illustrates an adjustable height safety jack 120 configured in accordance with another embodiment of the present invention. A bottle jack or piston jack 91 having a piston 93 is shown with the bottom secured or connected to a base 94. The top of the piston 93 is connected to the bottom of the saddle jack 92. Expansion or extension springs 140 and 141 are on opposing sides of the piston jack 91 with each of their bottom ends connected to the base 94. The top ends of the extension springs 140,141 are connected to a cross bar 142 which is connected to the top of the piston 93. In this manner the extension springs 140, 141 provide a constant contraction force between the jack saddle 92 and the base 94.

A base stand 121 includes two fully threaded posts 122 and 123 mounted on opposing ends of the base stand 121. The threaded posts 122,123 are mounted perpendicular to the planar base stand 121. The base 94 and the jack saddle 92 include through holes 138, 139 and 144, 145, respectively, that have larger diameters than the threaded posts 122,123, so the threaded posts 122,123 can pass freely through the holes 138, 139 and 144, 145, in the base 94 and the jack saddle 92, respectively, and that the holes 138, 139 of the base 94 and the holes 144,145 of the jack saddle 92 are in alignment so the fully threaded posts 122,123 can easily pass through. The piston jack or air jack 91, the cross-bar 142, and the jack saddle 92 are all connected. An air compressor 89 can be mounted on top of the base 94 to power the jack 91.

Stop nuts 128,129 are located on threaded posts 122,123, respectively, above the base stand 121 and below washers 136,137, respectively. The washers 136,137 are located below the base 94. Stop nuts 126,127 are located on threaded posts 122,123, respectively, between the base 94 and jack saddle 92. The stop nuts 126, 127 also are located between washers 132,134, and 133,135, respectively, that are located on the threaded posts 122,123, respectively. Washers 132, 133 and 134, 135 are located on the threaded rods 122, 123 between the base 94 and the jack saddle 92. All the washers 132,133, 134, 135, 136, 137 include apertures larger in diameter than the diameter of the threaded posts 122,123 so the washers can easily slide up and down over the threaded posts 122,123.

Raising Jack: The air jack 91 on the base 94 is supported by the washers 136, 137 on stop nuts 128,129. As the piston 93 of the jack 91 is raised, the jack saddle 92 is raised, then the stop nuts 126, 127 can be screw up under the jack saddle 92. When the piston 91 is lowered, the extension springs 140, 141 pull up the base 94, and the stop nuts 128,129 can be screwed up under the base 94, and the process can be repeated to raise the jack 91 again. The stop nuts 124 and 125 prevent the jack saddle 92 from going over the top of the threaded post 122, 123. Washers 130,131 are located between the bottom of the stop nuts 124, 125 and the jack saddle 92.

Lowering Jack: The jack 91 on the base 94 is supported by the stop nuts 128,129. The stop nuts 126,127 that support the saddle jack 92 can be screwed down to the desired height. Then the stop nuts 128,129 supporting the base 94 can be screwed down to the desired height, and the jack saddle 92 will follow down until supported by the stop nuts 126,127. Then the process can be repeated again to further lower the jack 91.

Figure 11:
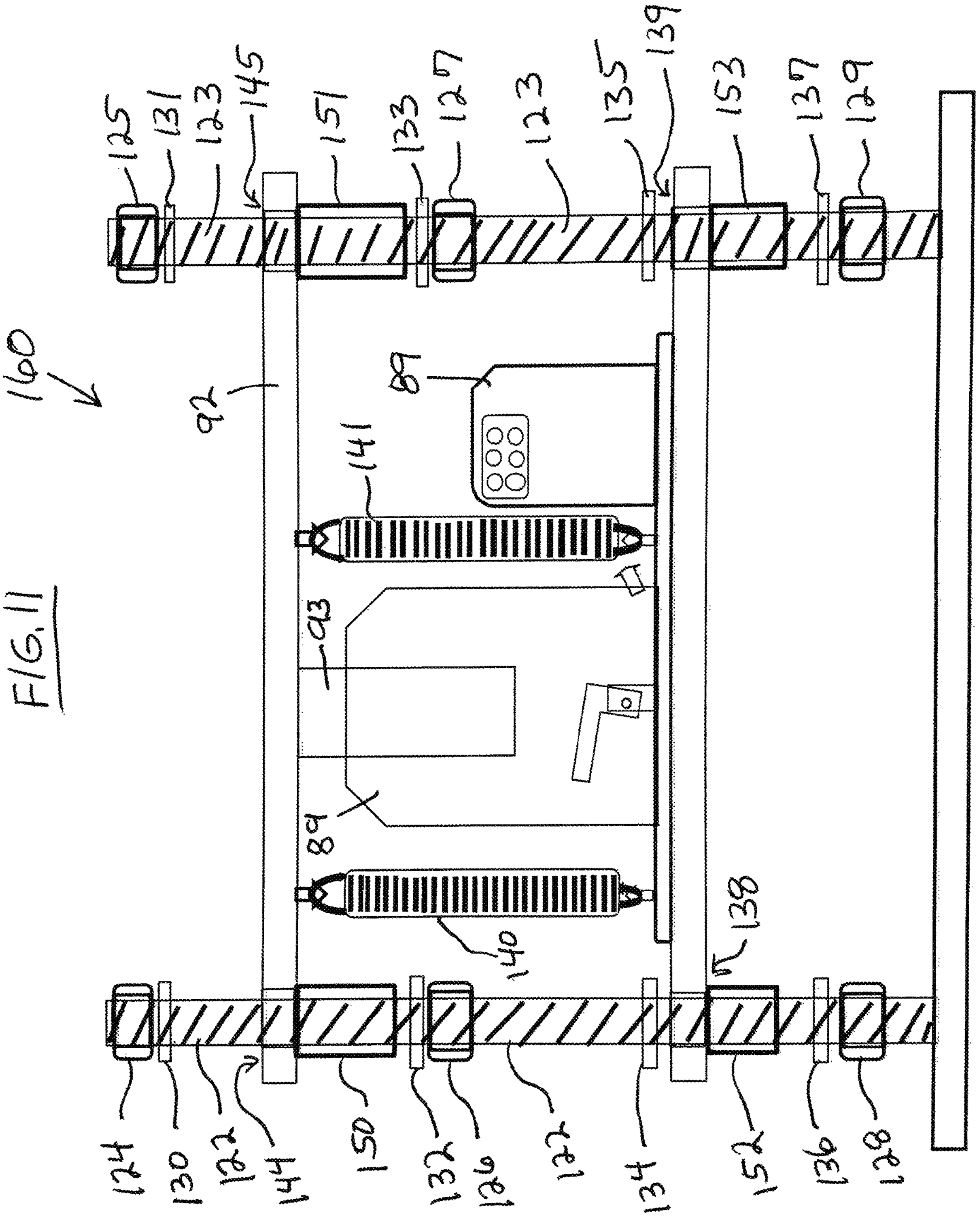
FIG. 11 is a cross-sectional side view of an adjustable height jack configured in accordance with a further embodiment of the present invention.

FIG. 11 illustrates an adjustable height safety jack 160 configured in accordance with another embodiment of the present invention. The adjustable height safety jack 160 is similar to the adjustable height safety jack 120 in FIG. 10, except the cross-bar 142 has been removed and the tops of the expansion springs 140, 140 are connected directly to the bottom of the jack saddle 92. Support tubes 150,151 are included around the threaded posts 122, 123, and have a smooth inner diameter larger than the threaded posts 122, 123 to enable the support tubes 150,151 to easily slide up and down on the threaded posts 122,123. The support tubes 150,151 are located on the threaded posts 122,123 between the jack saddle 92 and the stop nuts 126,127, respectively. Support tubes 152, 153 are included around the threaded posts 122,123, and have a smooth inner diameter larger than the threaded posts 122,123 to enable the support tubes 152,153 to easily slide up and down on the threaded posts 122,123. The support tubes 152,153 are located on the threaded posts 122,123 between the base 94 and the stop nuts 126, 127, respectively. The support tubes 150,151,152, 153 function to facilitate the jack saddle 92 and the base 94 sliding up and down on threaded posts 122,123 via holes 144,145 and the 138, 139, in the jack saddle 92 and base 94, respectively. Washers 132,133 are located between the support tubes 150,151 and the stop nuts 126,127. Washers 136,137 are located between the support tubes 152,153 and the stop nuts 128,129.

The raising and lowering operation of the jack 91 on the base 94 function similar to that described in reference to the adjustable height safety jack 120 in FIG. 10. While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A safety jack, comprising:

a piston jack to raise an object, the piston jack including a piston and a bottom on the piston jack;

a safety support to support the raised object, the safety support comprising a uniform base tube, a threaded rod, and a threaded stop nut;

the base tube having a top and a bottom and an inner surface;

the threaded rod movable within the base tube and having a portion of the threaded rod extending above the top of the base tube, wherein movement of the threaded rod within the base tube is unrestricted by the inner surface of the base tube;

the threaded stop nut rotatably connected on the portion of the threaded rod extending above the top of the base tube;

a jack saddle fixedly secured to a top of the piston and a top of the threaded rod, and the bottoms of the piston jack and the base tube are located on a substantially similar horizonal plane; and wherein the threaded stop nut can be screwed down onto the top of the base tube so as to prevent the piston of the piston jack from being lowered after the piston is raised.

2. The safety jack of claim 1, further comprising:

a jack head secured to a top of the jack saddle.

3. The safety jack of claim 1, further comprising:

a base; and wherein the bottom of the piston jack and the bottom of the base tube are connected to the base.

4. The safety jack of claim 1, wherein the threaded rod extends at least a length of the base tube.

5. The safety jack of claim 1, further comprising:

a second base tube having a top and a bottom and an inner surface;

a second threaded rod within the second base tube having a portion of the second threaded rod extending above the second base tube, where movement of the second threaded rod within the second base tube is unrestricted by the inner surface of the second base tube;

a second threaded stop nut on the portion of the second threaded rod extending above the top of the second base tube;

the jack saddle secured to a top of the second threaded rod; and wherein the second threaded stop nut can be screwed down onto the top of the second base tube so as to prevent the piston of the piston jack from being lowered after the piston is raised.

6. The safety jack of claim 5, wherein the bottom of the second base tube is connected to the base.

7. The safety jack of claim 1, further comprising:

a uniform support tube located around the threaded rod and above the top of the base tube to increase the height of the base tube.

8. A safety jack, comprising:

a piston jack having an inner tube, a bottom, a top surface, and a unitary piston having at least a portion within the inner tube, wherein an upper portion of the piston has a threaded surface and a lower portion of the piston has a smooth surface, and wherein movement of the threaded surface of the unitary piston within the inner tube is unrestricted by and can slide adjacent to an inner surface of the inner tube of the piston jack;

an O-ring around a groove portion of the smooth surface on the lower portion of the piston so as to provide an airtight seal between the smooth surface on the lower portion of the piston below the O-ring and the inner tube of the piston jack;

a threaded stop nut on the threaded surface of the upper portion of the piston above the top surface of the piston jack; and wherein screwing the threaded stop nut down so as to contact the top surface of the piston jack prevents the piston from being lowered after being raised.

9. The safety jack of claim 8, further comprising:

a jack head secured to a top of the piston.

10. The safety jack of claim 9, wherein a cross-section of the jack head has a U-shape configuration.

11. The safety jack of claim 9, wherein a cross-section of the jack head has a rectangular-shape configuration.

12. The safety jack of claim 9, wherein a cross-section of the jack head has a square-shape configuration.

13. The safety jack of claim 8, further comprising:

a base tube having a bottom and an inner surface;

a threaded rod within the base tube having a portion extending above the base tube, where movement of the threaded rod within the base tube is unrestricted by the inner surface of the base tube;

a second threaded stop nut on the portion of the threaded rod extending above the base tube;

a jack saddle connected to a top of the piston and a top of the threaded rod; and wherein the second threaded stop nut can be screwed down onto a top of the base tube so as to prevent the piston of the piston jack from being lowered after the piston has been raised.

14. The safety jack of claim 13, further comprising a base, wherein the bottom of the piston jack and the bottom of the base tube are connected to the base.

15. The safety jack of claim 8, further comprising: a riser tube around the unitary piston and located between the top surface of the piston jack and the threaded stop nut; and wherein the riser tube prevents the threaded stop nut on the piston from dropping below a top of the riser tube.

16. The safety jack of claim 8, further comprising:

a washer around the unitary piston and located between the stop nut and the riser tube.

17. A safety jack, comprising:

a planar base;

a piston jack to raise an object, the piston jack including a piston and a bottom on the piston jack;

a safety support to support the raised object, the safety support comprising a base tube, a threaded rod, and a threaded stop nut;

the base tube having a top and a bottom and an inner surface, the base tube around the threaded rod, and a portion of the threaded rod extending below the bottom of the base tube, and wherein movement of the threaded rod within the base tube is unrestricted by the inner surface of the base tube;

the threaded stop nut rotatably movable on the portion of the threaded rod extending below bottom of the base tube;

a jack saddle secured to a top of the piston and the top of the base tube; and wherein the threaded stop nut can be screwed up below the bottom of the base tube so as to prevent the piston of the piston jack from being lowered after the piston is raised.

18. The safety jack of claim 17, further comprising:

a washer around the threaded rod and located between the stop nut and the base tube.

* * * * *